Jan. 26, 1960 — M. A. SCHEG ET AL — 2,922,389
SEARCHLIGHT SIGNALS
Filed May 5, 1958 — 2 Sheets-Sheet 1
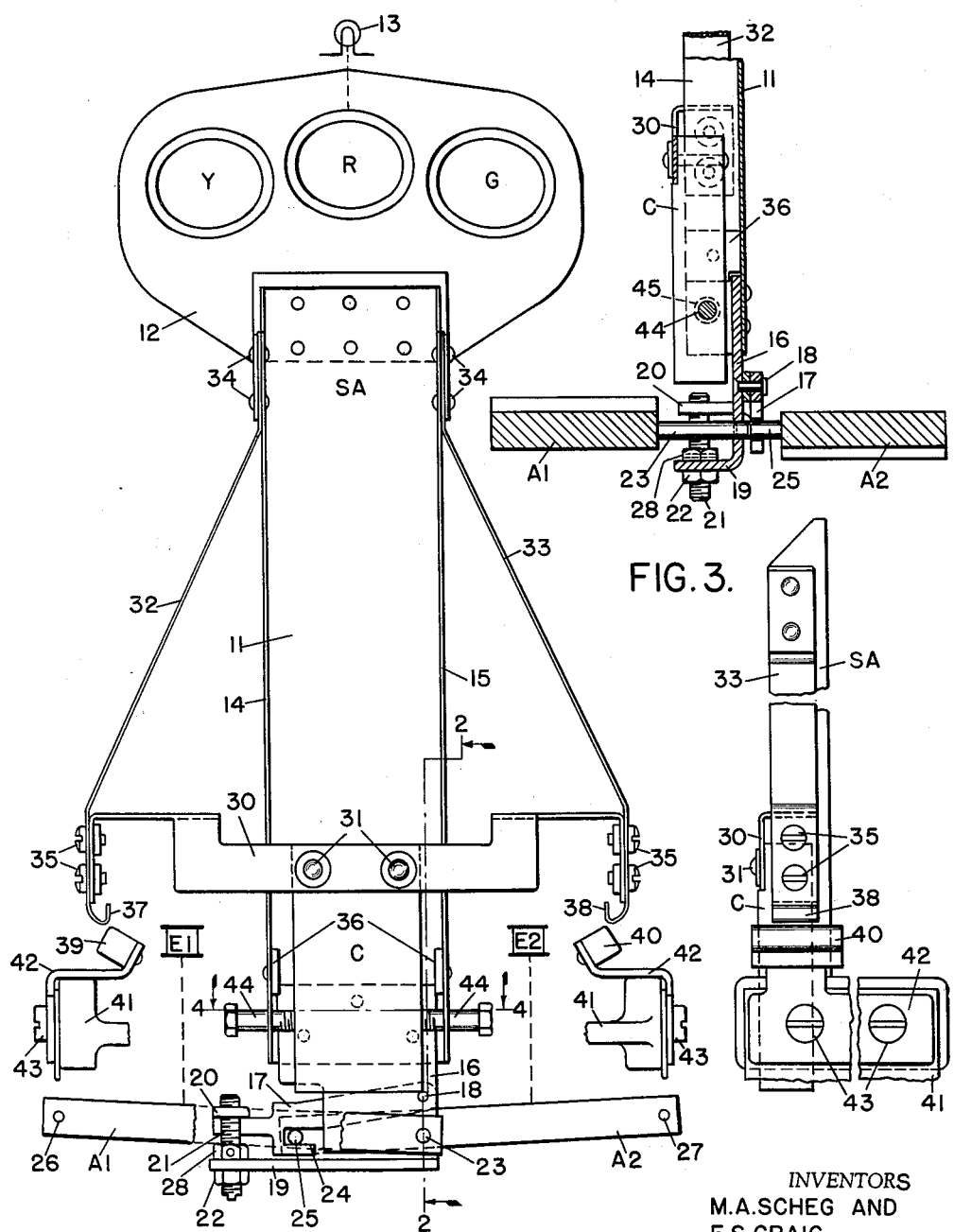
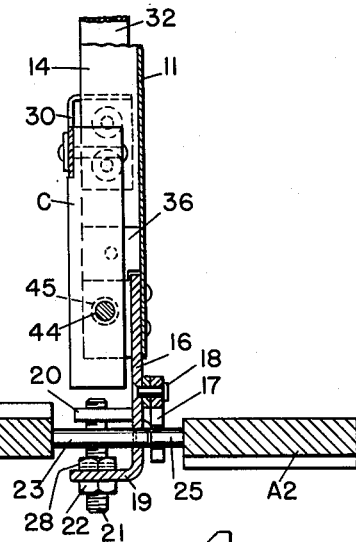
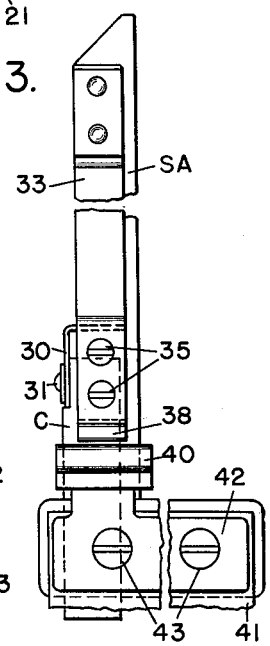
INVENTORS
M.A. SCHEG AND
F.S. CRAIG
BY
*Forest B. Hitchcock*
THEIR ATTORNEY

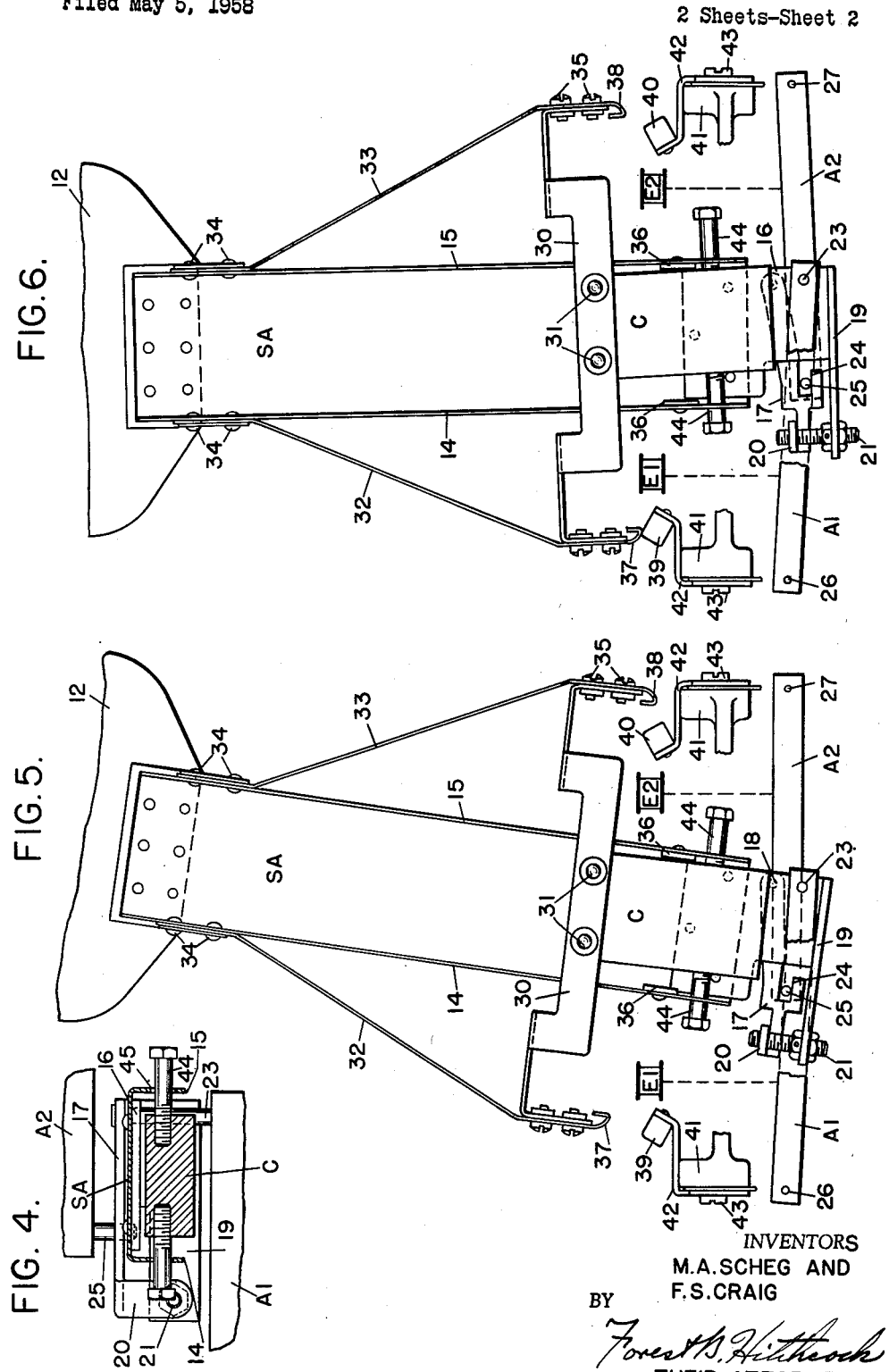
Jan. 26, 1960
M. A. SCHEG ET AL
2,922,389
SEARCHLIGHT SIGNALS
Filed May 5, 1958
2 Sheets-Sheet 2
INVENTORS
M.A. SCHEG AND
F.S. CRAIG
BY
THEIR ATTORNEY ns Patent Office 2,922,389
Patented Jan. 26, 1960

2,922,389

SEARCHLIGHT SIGNALS

Marcian A. Scheg, Rochester, and Frank S. Craig, Chili, N.Y., assignors to General Railway Signal Company, Rochester, N.Y.

Application May 5, 1958, Serial No. 733,145

4 Claims. (Cl. 116—18)

This invention relates in general to searchlight type signals used for displaying distinctive signal indications in railway signaling systems, and more particularly relates to the operation of the multiple aspect spectacle arm contained therein.

Signals of this type usually comprise a movable spectacle arm provided with distinctive color roundels which are selectively interposed in the signal light beam in accordance with traffic conditions to display the proper color light indication to the approaching train.

The spectacle arm operating mechanism to which the applicants' invention is applicable, includes two electroresponsive tractive type armatures. The normal position of the spectacle arm and operating mechanism is the deenergized position of the armatures wherein the spectacle arm rests in a central position to which it is biased by gravity. For safety reasons, this position is chosen as the stop indication position. The energization of one electroresponsive device will cause the spectacle arm to move to one extreme position where a caution indication is displayed; whereas, the energization of the other electroresponsive device will cause the spectacle arm to move to its other extreme position where a clear or proceed indication is displayed. The structure is such that only one armature is picked up at any given time.

In devices of this character, the spectacle arm, which is in the form of a pivoted vane, is subject to rapid movements from one position to the other. This action tends to produce an overrun when the spectacle arm is operated to a center position and also tends to produce a rebound when the spectacle arm reaches either of its extreme positions. As the light beam in the signal is constant, any excessive overrun or rebound of the spectacle arm is very objectionable since it might momentarily position the adjacent color roundel in the path of the light beam and momentarily display a color aspect different than that intended.

The present invention proposes a means whereby damping action is provided for the spectacle arm to reduce overrun and rebounding action to a minimum which is less than the spaced distance between the color roundels so that the display of a false indication due to faulty spectacle operation is eliminated.

Generally speaking, in the particular embodiment of the invention herein disclosed, a counterweight is movably mounted within the confines of the channel shaped spectacle arm at a location near and directly above the spectacle arm pivot means. The counterweight is attached to a cross arm member which in turn is suspended pendulum fashion from the top of the spectacle arm by means of two thin resilient strips of phosphor bronze material or the like. This type of suspension means normally positions the counterweight centrally between the sides of the spectacle arm due to gravity, but the counterweight is permitted to move either to the right or left when the spectacle arm is tilted.

The cross arm member is provided with a downwardly extending resilient spring buffer at each end thereof which buffers are positioned to contact against fixed bumping blocks during a movement of the spectacle arm from an extreme operated position back to its normal gravity biased center position.

Briefly stated, when the spectacle arm is operated to either extreme right or left position, its movement is quite rapid and ahead of the counterweight. Consequently, about the time that the spectacle arm reaches its extreme movement and tends to rebound back towards its center position, the counterweight will swing over pendulum fashion and strike the side portion of the spectacle arm, thus arresting the rebound motion of the spectacle arm and causing it to settle back to its intended operated position.

Consider now the operation of the spectacle arm back to its center position. In this instance the dropaway action of its respective armature operator is very rapid causing a rapid movement of the spectacle arm. In this particular operating movement, the momentum of the spectacle arm tends to carry it slightly beyond its center position, possibly to the extent of approximately one or two degrees. At this point of operation, the counterweight and its associated cross arm member, swinging pendulum fashion and trying to catch up to the movement of the spectacle arm, will cause the spring buffer to strike the fixed bumping block, thus arresting the overrun movement of the spectacle arm. The spectacle arm then will seek to attain its normal biased center position and the counterweight will do likewise.

Also, as previously mentioned and more fully explained hereinafter, the operative armatures are of considerable mass and weight. This mass weight and the means of pivoting the spectacle arm thereto, is also an important factor in urging the spectacle arm to remain in its operated positions. The main object of the applicants' proposed damping means is to minimize the rebounding and overrun tendencies of the spectacle arm and limit such movement to a stabilized degree whereby the degree of unwanted movement is much less than the movement required to change the signal aspects from one color to another, thus preventing a momentary false signal indication.

Other objects, purposes and characteristic features of the present invention and the operation thereof will be more apparent from the following detailed description of the specification when considered in connection with the accompanying drawings in which:

Fig. 1 is a front view of a device incorporating the present invention shown somewhat diagrammatically and shows the spectacle arm with its counterweight and a mounting and operating means therefor;

Fig. 2 is a sectional side elevation of a device incorporating the present invention taken substantially on the line 2—2 of Fig. 1 as viewed in the direction of the arrows;

Fig. 3 is a side elevational view of part of the apparatus shown in Fig. 1 to illustrate the counterweight supporting means;

Fig. 4 is a partial sectional top view of a device incorporating the present invention taken substantially on the line 4—4 of Fig. 1 as viewed in the direction of the arrows;

Fig. 5 is a partial front view of a device incorporating the present invention showing the position of the apparatus after an operation from its normal center indicating position to its extreme right-hand operated position; and Fig. 6 is a partial front operational view similar to Fig. 5 except that it shows the position of the apparatus during a return movement to its center position at a point wherein the spectacle arm has slightly overrun the center position due to its momentum.

The drawings are partially diagrammatic and have been shown as such more for the purpose of illustrating the applicants' invention as applied to a well known type of searchlight signal. Such a signal construction and operating means with the exception of a few variations has been shown and described in detail in the U.S. Patent No. 2,750,577, granted June 12, 1956, to Ralph W. Hewes, and if necessary, reference may be made to such patent for a more complete understanding of the construction and mode of operation. This invention may be considered in the nature of an improvement in the movable spectacle arm damping means disclosed and claimed in said patent and it is believed a brief description herein of the operating characteristics and assembly of such a searchlight signal mechanism will suffice, more devoted attention being given to the applicant's improvements.

Referring now more particularly to Figs. 1 to 4 inclusive of the drawings, there has been shown a spectacle arm SA which comprises an arm 11 to which is suitably attached at its upper end a spectacle 12. The spectacle 12 is provided with the usual color glasses designated Y, R and G to indicate the colors used, namely, yellow, red and green, these color glasses being suitably spaced and mounted to cooperate one at a time with a light beam source 13 when the spectacle arm SA is positioned in a particular one of its three positions, as explained hereinafter. The arm 11 is channel shaped in cross section which provides two side walls 14 and 15.

Attached to the bottom end of the arm 11 by rivets or the like is an articulated bracket, this bracket having two members 16 and 17 which are pinned together at one side by a pin 18 to form a hinge connection. The other side of the bracket member 16 is provided with a projecting arm 19 while the other side of the bracket member 17 is provided with a projecting arm 20. The ends of these projecting arms 19 and 20 are connected together by a stud bolt 21 and nut 22 in a manner to provide an adjustable connection whereby the distance between the arms 19 and 20 may be varied, for reasons explained hereinafter. The bracket member 16 is provided with a hole to constitute a bearing in which a pivot pin 23 is journaled. Likewise, the bracket member 17 is provided with a rectangular slot 24 which acts as a bearing in which a pivot pin 25 is journaled.

The pivot pins 23 and 25 are carried by a pair of armatures A1 and A2 which form a part of electroresponsive devices which have been illustrated rather diagrammatically for convenience and have been designated E1 and E2. These electroresponsive devices E1 and E2 may be of any well known construction, as for example the same as shown and described in the above referred to Patent No. 2,750,577, and usually comprise a magnetic core structure and an associated coil which when energized will attract an associated pivoted armature, thus causing a movement of the free end of the armature to a set operated position. In the illustration shown on the drawings in connection with this invention, these electroresponsive devices E1 and E2 have been shown one on either side of the spectacle arm SA and are positioned so that their respective armatures A1 and A2 lie in a substantially horizontal plane and have their free ends which carry the pivot pins 23 and 25 so located that they cooperate with the bearings located in the bracket members 16 and 17.

The electroresponsive device E1 has its armature suitably pivoted such as by a pin 26. Being normally deenergized, it is gravity biased downward against a suitable stop limitation (not shown). Its free end which carries the pivot pin 23 is journaled in the bracket member 16. Likewise, the electroresponsive device E2 has its armature pivoted on a pin 27 and its free end which carries the pivot pin 25 is journaled in the bracket member 17. It should now be understood that the pivot pins 23 and 25 form the sole support and mounting means for the spectacle arm SA, the armatures A1 and A2 carrying the weight of the complete assembly. It should also be understood that the pivot pins 23 and 25 alternately act as pivots for the spectacle arm SA during its movement depending on the direction of rotation of the spectacle arm SA. For example, energization of the electroresponsive device E1 will cause its armature A1 to be attracted which action will move the pivot pin 23 upward, causing the spectacle arm SA to rotate counterclockwise around the then stationary pivot pin 25. Likewise, an upward movement of the armature A2 and its associated pivot pin 25 will cause the spectacle arm SA to rotate clockwise around the pivot pin 23.

As previously mentioned, adjustment means is provided between the two bearing bracket members 16 and 17. This is necessary in order to obtain the proper alignment between the color discs Y, R and G and the light beam source 13, as well as insuring that the spectacle arm SA is balanced in a vertical position when in its center neutral position as shown in Fig. 1. In order to adjust the position of the spectacle arm SA, the lock nut 22 must be backed off after which the adjusting screw 21 may be turned in the desired direction. As the adjusting screw 21 is threaded into the extending arm 20, the distance between the shoulder 28 on adjusting screw 21 and the extending arm 20 may be varied, after which the adjusting means is securely locked in place again by tightening the nut 22. Thus, it is obvious that the spectacle arm may be slightly rotated either clockwise or counterclockwise on its pivot pin 23 merely by raising or lowering the position of the extending arm 19 of the bracket member 16 until the desired vertical position is obtained. The slotted bearing arrangement 24 is provided in the bearing bracket member 17 to permit horizontal movement of the pivot pin 25 and prevent binding as any vertical movement of the pivot pin 25 during operation must of necessity be in the form of an arc. Also, slight tolerances must be permitted during assembly as the location of the armature pivot pins 26 and 27 with respect to each other will determine the exact distance between the pivot pins 23 and 25 which are carried in the free ends of these armatures A1 and A2.

Referring now more particularly to the counterweight damping means for the spectacle arm SA, the counterweight C consists of a rectangular shaped mass of metal which is suspended within the confines of the side walls 14 and 15 of the spectacle arm SA at a central location directly above and as close as possible to the spectacle arm pivotal points. The suspension means for the counterweight C consists of a cross arm member 30 to which the counterweight C is attached by means of rivets 31 or the like. This cross arm member 30 extends beyond and at right angles to the sides 14 and 15 of spectacle arm SA and is attached to the spectacle arm sides 14 and 15 near their upper ends by means of two thin flat resilient strips 32 and 33 of Phosphor bronze material which are suitably fastened thereto, as by rivets 34 and screw bolts 35.

It can now be seen that the mass weight of the counterweight C and the cross arm member 30 is suspended pendulum fashion on the two thin hanger strips 32 and 33 and seeks a central position due to gravity. The width of the counterweight C is considerably less than the spacing between the two side walls 14 and 15 of the spectacle arm SA so that when the spectacle arm SA is in its vertical central gravity biased position, the counterweight C will also be in its central gravity biased position, thus leaving a clearance on both sides of the counterweight C, as shown in Fig. 1. When the spectacle arm SA is tilted to either of its extreme right or left operated positions, it is obvious that the counterweight C will follow the movement of the spectacle arm SA and swing in the same direction until it comes into contact with a confining side wall, as for example, as shown in Fig. 5. Suitable stop pads 36 are fastened to the side walls 14 and 15 to act as bumper stops for the counterweight C.

As already mentioned, the two resilient hanger strips 32 and 33 are fastened near their lower ends one to each end of the cross arm member 30. However, the ends of these two hanger strips extend downward beyond the cross arm member 30 and are bent to form spring buffers 37 and 38 which at certain times are positioned to strike against fixed bumper blocks or abutments 39 and 40. These bumper blocks 39 and 40 are suitably fastened to the frame work 41 of the signal mechanism by means of brackets 42 and screws 43 and are preferably made of a hard plastic material such as nylon or the like rather than metal, so as to minimize wear and contact noise. The purpose of these spring buffers and bumper blocks will be pointed out as the description of the operation progresses. It should be noted, however, that with the spectacle arm SA in its normal gravity biased central position as shown in Fig. 1, the counterweight C may be swung from side to side within the confines of the spectacle arm side walls 14 and 15 and the spring buffers 37 and 38 will not interfere with or engage their respective bumper blocks 39 and 40.

With the signal mechanisms in its normal gravity biased control position just described, the spectacle arm SA positions its color roundel R in the path of the light source 13 so that the red color aspect or danger signal indication is visible. Let us now assume that the spectacle arm SA is operated from its normal red danger position to its yellow caution position. With reference to Figs. 1 and 5, it can be seen that when the electroresponsive device E2 is energized, its armature A2 will be picked up causing the pivot pin 25 to move upward. The spectacle arm SA will then pivot on the pivot pin 23 and rotate in a clockwise direction until the yellow roundel Y is in the path of the light source 13, at which time the armature A2 reaches its fully picked up stop position.

During this movement the spectacle arm SA picks up quite a bit of momentum and when the armature A2 comes to an abrupt stop, the spectacle arm SA is inclined to rebound back towards its center position. Although in normal operation this rebound action is opposed by the pull of the attracted armature A2 and the downward gravity of the other armature A1, rebound action of the spectacle arm SA still persists. Any great amount of rebound action is very objectional as it could cause a momentary display of the red indication when the yellow indication is called for. Thus, the counterweight damping means as proposed herein is very essential to curtail this rebound action.

Referring again to the operation of the spectacle arm SA as just described, the fact that the counterweight C is suspended pendulum fashion from the upper part of the spectacle arm SA causes its motion to lag behind the motion of the spectacle arm SA. Consequently, at about the same time that the spectacle arm SA starts to rebound back towards its center position, the movement of the counterweight C to the right has brought it into position wherein it strikes the stop 36 on the right side wall 15 of the spectacle arm, thus arresting the rebound action and settling the spectacle arm SA back into its intended operated yellow indication position.

Assuming now, for the purpose of explanation, that it is desired to operate the spectacle arm SA from its yellow indication position as shown in Fig. 5 back to its normal biased red indication position as shown in Fig. 1. By deenergizing the electro-responsive device E2, the armature A2 is permitted by gravity to drop away to its rest position against a stop (not shown). This causes the spectacle arm SA to rotate counterclockwise whereby the red color roundel R will be positioned in the path of the light source 13. Here again, when the armature A2 comes to an abrupt stop in its down position, the momentum of the spectacle arm SA will normally carry on its motion past its center position even though it is opposed by the gravity of the other armature A1 as the pivot pin 25 takes over to act as a pivot for the spectacle arm SA.

As previously mentioned, the movement of the counterweight C will lag behind the movement of the spectacle arm SA due to its pendulum like suspension means. In this particular movement of the spectacle arm SA, when it has reached a point of approximately one or two degrees overrun past its center position to the left as shown in the operational view Fig. 6, the counterweight C will be in position to start its movement to the left also. However, at this point of the operation, the combination of the tilt of the spectacle arm SA plus the lag in movement of the counterweight C has placed the cross arm member in a tilted position whereby its associated spring buffer 37 has contacted the inclined surface of the bumper block 39. This action will prevent movement of the counterweight C temporarily and also will stop the overrun movement of the spectacle arm SA and cause a reaction whereby the spectacle arm SA will start to move back to its center gravity biased position. This movement of the spectacle arm SA to the right, back towards its center position, will lift the buffer spring 37 clear of the bumper block 39 and permit the counterweight C and its associated cross arm member 30 to complete its movement to the left. Thus, both the spectacle arm SA and the counterweight C will come to rest in their center gravity biased positions, as illustrated in Fig. 1.

Upon a full movement of the spectacle arm SA from its extreme yellow indication position to its other extreme green indication position, the electroresponsive device E2 would be deenergized and the electroresponsive device E1 would be energized. Deenergization of the electroresponsive device E2 would cause the armature A2 to drop away and operate the spectacle arm SA through the same cycle as just described in connection with a movement from the yellow indication position to the red indication position. Also, energization of the electroresponsive device E1 would cause the armature A1 to pick up and the spectacle arm SA would continue to rotate in a counterclockwise direction upon the pivot pin 25 until the green roundel G was positioned in the path of the light source 13. This cycle of operation of the spectacle arm SA from its central position to a left-hand position is similar to the central to right-hand cycle of operation previously described except that the direction of movement is reversed and the counterweight C acts to hold the spectacle arm in its left-hand operated position.

In this connection, with respect to the full movement of the spectacle arm SA from its yellow indication position through the red indication position to the green indication position, because the armature A2 drops away and the armature A1 picks up practically simultaneously or directly thereafter, the spectacle arm pivotal point quickly shifts from one pivot pin 23 to the other pivot pin 25 as the spectacle arm SA passes through its center position. Shortly thereafter, the spring buffer 37 will strike the bumper block 39 and temporarily stop rotation of the spectacle arm SA. Thus, the armature A1, continuing its upward movement, will cause the spectacle arm SA and its associated pivot pin 25 and armature A2 to lift upward to the extent that the spring buffer 37 will clear the bumper block 39. This action will again permit rotation of the spectacle arm SA about its pivot pin 25 which, with its armature A2, will again drop into position. The continued upward movement of the armature A1 will rotate the spectacle arm SA to its extreme counterclockwise position wherein the green indication will be displayed. As the spring buffer 37 is lifted clear of the bumper block 39; the counterweight C will also be permitted to continue its movement in a direction to the left until it strikes and bears against the left-hand stop pad 36. The net result is that even though the spring buffer 37 will still strike the bumper block 39, the movement of the spectacle arm SA is subject to only a momentary hesitation when it is intentionally moved through its center gravity biased position as the damping means provided herein is rendered practically ineffective.

It should be readily understood that a movement of the spectacle arm SA from its green clear position back to its red center danger position is accomplished merely by deenergization of the electroresponsive device E1 which permits the armature A1 to drop away. The cycle of action would be similar to that already described in connection with a movement from the yellow indication position back to the red indication position except that the direction of movement of the spectacle arm SA is reversed. Thus the counterweight movement would be to the right and the spring buffer 38 would strike the bumper stop 40 to prevent any excess overrun movement of the spectacle arm SA.

With particular reference to Figs. 1, 2 and 4, it will be noted that the counterweight C is provided with a projecting screw or pin 44 on each side thereof, the screw in each case extending through an enlarged hole 45 located in the respective side walls 14 and 15 of the spectacle arm SA. As previously mentioned, the counterweight C is confined within these side walls 14 and 15 and the screws 44 extending therethrough will limit the outward movement of the counterweight C in a direction away from the back wall of the spectacle arm SA. This is necessary due to the pendulum like counterweight suspension means in order to prevent the counterweight C from swinging outward due to tipping of the signal mechanism during ordinary handling or in shipment, as such a movement may possibly cause damage.

From the foregoing description when considered in connection with the accompanying drawings, it is believed that the disclosure in the present invention provides a novel damping means whereby a vane type spectacle arm adapted for rotary movement in either direction from its center gravity biased position or back to its center position may be suitably damped to prevent any excess overrun or rebound movements during its operation.

Upon a movement of the spectacle arm SA from its center gravity biased position to either one of its extreme operated positions, the lagging movement action of the counterweight C, due to its specific location and mounting means, provides the application of a force at the proper time in opposition to the rebounding action of the spectacle arm SA. This action dampens any reverse motion of the spectacle arm SA and also positions the counterweight C so that it helps maintain the spectacle arm SA in its intended operated position.

Upon a movement of the spectacle arm SA back to its center gravity biased position from either of its extreme operated positions, damping action is provided as the lagging movement action of the counterweight C again comes into play, causing the cross arm member 30 to tilt to the extent that the leading buffer spring (37 or 38) will come in contact with its respective bumper stop (39 or 40). This action stops the overrun movement of the spectacle arm SA and also temporarily stops the movement of the counterweight C to a central position. As gravity takes over, both the spectacle arm SA and the counterweight C will return to their center positions.

Upon a movement of the spectical arm SA from one extreme operated position through its center position to its other extreme operated position, the center position damping means is rendered practically ineffective and does not materially slow up the movement of the spectacle arm. This is due to the fact that one armature is picked up immediately after the other armature drops away so that, as previously explained, the spectacle arm SA changes pivot points and also lifts up to permit the buffer springs to clear their respective bumper blocks. This action practically eliminates the damping action which would be present if the spectacle arm SA were intended to be stopped in its center position.

Having thus illustrated and described the main objects of the present invention and the manner in which it performs, it should be understood that various adaptations and deviations in the structure could be made without departing from the spirit of the invention within the scope of the appending claims.

What we claim is:

1. In a search light signal having a vertical spectacle arm pivotally supported at its lower end and operable to either side of a central biased position, the combination of a pendulum member, a support means connected to the upper portion of said spectacle arm for supporting said pendulum member adjacent the support of said spectacle arm and permitting swinging movement, two spaced stationary abutments one on each side of said spectacle arm, two spaced buffer springs attached to opposite sides of said pendulum member, each of said buffer springs being directly above its respective one of said abutments in a position to clear it when said spectacle arm is in its center position but capable of engaging it when said spectacle arm is returning to its center biased position from an extreme position and said pendulum member is lagging with respect thereto when such buffer spring is in the lead position.

2. The combination according to claim 1 wherein said support means permits swinging movement through only a limited range.

3. The combination according to claim 1 wherein said support means comprises two flexible metal strips, one on each side of said spectacle arm.

4. In a search light signal having a vertical spectacle arm pivotally supported at its lower end and operable to either side of a central biased position, the combination of a pendulum member, a support means connected to the upper portion of said spectacle arm for supporting said pendulum member to permit limiting swinging movement with respect to said spectacle arm, two spaced stationary abutments one on each side of said spectacle arm, two spaced buffer members attached to opposite sides of said pendulum member, each said buffer member being located closely adjacent and directly above its respective one of said abutments when said spectacle arm is in its center position and said pendulum member is in a pendent position, and each said buffer member assuming a position to engage its respective abutment when said spectacle arm is moved to its center position with said pendulum member lagging such movement when that particular buffer member is in advance of said spectacle arm for such direction of movement.

References Cited in the file of this patent

UNITED STATES PATENTS

| | | |
|---|---|---|
| 2,493,946 | Craft et al. | Jan. 10, 1950 |
| 2,750,577 | Hewes | June 12, 1956 |
| 2,790,154 | Moore | Apr. 23, 1957 |